(12) United States Patent
Fogtmann et al.

(10) Patent No.: US 10,261,641 B2
(45) Date of Patent: Apr. 16, 2019

(54) PATTERN RECOGNITION WITH A NON-DETECTABLE STENCIL ON THE TOUCH-SENSITIVE SURFACE

(71) Applicant: LEGO A/S, Billund (DK)

(72) Inventors: Maiken Hillerup Fogtmann, Vejle (DK); Jens Valentin Laulund, Hedensted (DK); Daniel W. Mathiasen, Hedensted (DK)

(73) Assignee: LEGO A/S, Billund (DK)

( * ) Notice: Subject to any disclaimer, the term of this patent is extended or adjusted under 35 U.S.C. 154(b) by 0 days.

(21) Appl. No.: 15/319,217

(22) PCT Filed: Jul. 1, 2015

(86) PCT No.: PCT/DK2015/050196
§ 371 (c)(1),
(2) Date: Dec. 15, 2016

(87) PCT Pub. No.: WO2016/000720
PCT Pub. Date: Jan. 7, 2016

(65) Prior Publication Data
US 2017/0160832 A1    Jun. 8, 2017

(30) Foreign Application Priority Data

Jul. 3, 2014 (DK) ................................ 2014 70414

(51) Int. Cl.
*G06F 3/044* (2006.01)
*G06F 3/045* (2006.01)
(Continued)

(52) U.S. Cl.
CPC ............ *G06F 3/044* (2013.01); *A63F 13/214* (2014.09); *A63F 13/98* (2014.09); *A63H 33/042* (2013.01);
(Continued)

(58) Field of Classification Search
CPC ........... G06F 3/044; G06F 2203/04102; G06F 3/045; G06F 3/039; G06F 3/0488;
(Continued)

(56) References Cited

U.S. PATENT DOCUMENTS

| 7,993,201 | B2 * | 8/2011 | Matsumoto | ............. A63F 13/42 345/173 |
| 2007/0063986 | A1 * | 3/2007 | Hoga | ...................... A63F 13/06 345/173 |

(Continued)

FOREIGN PATENT DOCUMENTS

| CN | 104321735 A | 1/2015 |
| JP | 2006-277051 A | 10/2006 |

(Continued)

OTHER PUBLICATIONS

International Search Report, issued in corresponding international applicaiton No. PCT/DK2015/050196, dated Sep. 25, 2015.

(Continued)

*Primary Examiner* — Temesghen Ghebretinsae
*Assistant Examiner* — Ivelisse Martinez Quiles
(74) *Attorney, Agent, or Firm* — Day Pitney LLP (57) ABSTRACT

The present invention relates to a method of providing input to an electronic unit comprising a touch-sensitive surface that is configured for registering application of touch by a flexible unit and a toy comprising an electronic unit comprising a touch-sensitive surface and a structure; the structure configured from a material that cannot be registered by the touch-sensitive surface, and it comprises, either at the periphery or within the periphery, at least one marked position. One or more flexible units that comprise(s) material that can be registered by the touch-sensitive surface, wherein the one or more flexible units extend(s) past the top side of the structure and to the bottom side of the structure, to the effect that the registration of a flexible unit is conditioned by the configuration of the at least one marked position.

12 Claims, 4 Drawing Sheets

(51) Int. Cl.
  *G06F 3/0488* (2013.01)
  *G06F 3/039* (2013.01)
  *A63H 33/08* (2006.01)
  *A63H 33/04* (2006.01)
  *A63F 13/214* (2014.01)
  *A63F 13/98* (2014.01)

(52) U.S. Cl.
  CPC ........... *A63H 33/086* (2013.01); *G06F 3/039* (2013.01); *G06F 3/045* (2013.01); *G06F 3/0488* (2013.01); *A63H 2200/00* (2013.01); *G06F 2203/04102* (2013.01)

(58) Field of Classification Search
  CPC ..... A63F 13/98; A63F 13/214; A63H 33/042; A63H 33/086; A63H 2200/00
  See application file for complete search history.

(56) References Cited

U.S. PATENT DOCUMENTS

| | | |
|---|---|---|
| 2007/0184900 A1 | 8/2007 | Matsumoto et al. |
| 2010/0045627 A1 | 2/2010 | Kennedy |
| 2012/0062490 A1 | 3/2012 | Heatherly et al. |
| 2012/0194457 A1 | 8/2012 | Cannon et al. |
| 2014/0078069 A1 | 3/2014 | Hung |
| 2014/0354594 A1* | 12/2014 | Kreutzer ................. G06F 3/044 345/174 |

FOREIGN PATENT DOCUMENTS

| | | |
|---|---|---|
| JP | 2008-123163 A | 5/2008 |
| JP | 2014-052666 A | 3/2014 |
| JP | 2015-509225 A | 3/2015 |
| WO | 2011-151881 A1 | 12/2011 |
| WO | 2012017205 A2 | 2/2012 |
| WO | 2013/087930 A1 | 6/2013 |
| WO | 2013-087930 A1 | 6/2013 |

OTHER PUBLICATIONS

Written Opinion of the International Searching Authority, issued in corresponding international applicaiton No. PCT/DK2015/050196, dated Sep. 25, 2015.

Search Report issued in Danish priority application No. PA 2014 70414, dated Jan. 27, 2015.

EPO's Official Communication issued in corresponding European patent application No. 15 747 379.4, dated Aug. 30, 2018.

Original Notification of Reasons for Refusal issued in corresponding Japanese Patent Application No. 2016-575955, dated Jan. 15, 2019.

English language machine translation of Notification of Reasons for Refusal issued in corresponding Japanese Patent Application No. 2016-575955, dated Jan. 15, 2019.

* cited by examiner

PATTERN RECOGNITION WITH A NON-DETECTABLE STENCIL ON THE TOUCH-SENSITIVE SURFACE

CROSS-REFERENCE TO RELATED APPLICATIONS

This application is a U.S. National Stage of International Application No. PCT/DK2015/050196, filed on 1 Jul. 2015 and published on 7 Jan. 2016, as WO 2016/000720 A1, which claims the benefit of priority to Danish Patent Application No. PA 2014 70414, filed on 3 Jul. 2014.

The present invention relates to a method of providing input to an electronic unit comprising a touch-sensitive surface that is configured for registering application of touch by a flexible unit and a toy comprising an electronic unit comprising a touch-sensitive surface and a structure.

BACKGROUND

A touch-sensitive screen, also designated a touch screen, comprises a touch-sensitive surface wherein, by means of a finger or a pointing device, one is capable of navigating on the unit, and wherein the touch-sensitive surface is configured for being able to register a finger or a pointing device. That registration may be based on resistive technology that requires a lighter pressure on the surface, but the registration may also be based on capacitive technology, whereby sensing in the form of a capacitive change, either by light touch or with no direct application of touch to the capacitive screen, can be registered. Interactive, touch-sensitive surfaces are now getting very widespread and are used eg on smartphones and tablet computers.

Toys are available where physical figures interact with such touch-sensitive, interactive screens, such as tablet computers. Those physical figures have built-in touch points whereby the touch-sensitive, interactive screen is capable of registering the physical figure which, via the software, is subsequently able to perform the programmed effects by the presence of the physical figure. For instance, figures in the form of cars, animals or individuals are known, and when the figure is located on a tablet, the figure has various capabilities on the screen.

However, in many cases it is desirable to increase the scope for variation.

BRIEF DESCRIPTION OF THE INVENTION

It is therefore the object of the invention to provide a method that increases the scope for variation available for play.

As set forth above, this is accomplished by the method comprising the following steps: to provide a structure configured from a material that cannot be registered by the touch-sensitive surface, and which structure has a top side and a bottom side having an area that is smaller than the area of the touch-sensitive surface, and wherein the area of the bottom side is delimited by an outer periphery on the structure, and wherein the structure comprises, either at the periphery or within the periphery, at least one marked position, which position is configured with a view to the deployment of a flexible unit; to provide one or more flexible units that comprise(s) material that can be registered by the touch-sensitive surface, wherein the one or more flexible units extend(s) past the top side of the structure and to the bottom side of the structure, to the effect that the registration of a flexible unit is conditioned by the configuration of the at least one marked position; to deploy the structure on the touch-sensitive surface; to deploy the one or more flexible units in the at least one marked position such that the touch-sensitive surface is capable of registering the position of the one or more flexible units.

Hereby an increased scope of variation is obtained for the interaction between a physical, three-dimensional structure and the virtual world.

According to one embodiment of the invention, the method comprises the following step: to register the specific pattern that is formed by marked positions with flexible units that are in contact with the touch-sensitive surface.

Hereby the option is enabled to create, on one's own, completely unique patterns and hence to create new functions in the virtual world.

According to one embodiment of the invention, the method further comprises the following steps: to move the one or more flexible units across along the touch-sensitive surface whereby the structure follows the movement across along the touch-sensitive surface; to recognize the registered specific pattern; to register the movement of the specific pattern.

According to one embodiment of the invention, the method comprises to provide a structure comprising at least two marked positions.

Hereby an increased scope for variation is accomplished in respect of the movement pattern on the touch-sensitive surface.

According to one embodiment of the invention, the method further comprises to provide at least two structures.

Hereby further variation is obtained in the options available for combination.

According to one embodiment of the invention, the method comprises to provide one or more flexible units wherein the one or more flexible units is/are constituted by one or more fingertips.

Hereby direct interaction is accomplished between the user, a physical figure/structure, and the virtual world.

According to a further aspect of the invention, it relates to a toy comprising an electronic unit comprising a touch-sensitive surface and a structure, characterised in that the structure is made of a material that cannot be registered by the touch-sensitive surface, and which structure has a top side and a bottom side having an area that is smaller than the area of the touch-sensitive surface, and wherein the area of the bottom side is delimited by an outer periphery on the structure, and wherein the structure comprises, either at the periphery or within the periphery, at least one marked position, which position is configured with a view to the deployment of a flexible unit; and wherein the electronic unit is configured to be able register application of touch by a flexible unit, and wherein the registration of the flexible unit on the touch-sensitive surface is conditioned by the configuration of the marked position, the flexible unit abutting on the top side of the structure and extending past the top side of the structure and to the bottom side to the effect that the flexible unit is capable of coming into contact with the touch-sensitive surface.

Hereby increased scope for variation is obtained for registering and recognizing specific input to an electronic unit and thereby for creating new functions.

According to one embodiment of the invention, the structure comprises at least two marked positions. Hereby the option of a predefined specific pattern is provided.

According to one embodiment of the invention, the structure consists of a toy building set that comprises at least two toy building blocks, each of said toy building blocks being provided with one or more complementarily configured coupling means to the effect that the at least two toy building blocks can be interconnected to form a structure, and that the at least one toy building element comprises one or more marked positions for positioning of one or more flexible units.

According to an embodiment of the invention, the one or more toy building elements comprise(s) at least two different types of coupling means, such as couplings studs and complementary coupling means According to an embodiment of the invention, the at least one marked position is constituted by one or more C- or U-shaped cut-outs and/or one or more through-going holes.

According to an embodiment of the invention, the one or more marked positions for positioning of flexible units comprise(s) one or more edges whereby the flexible units are prevented from moving relative to the structure in a plane in parallel with the touch-sensitive surface to the effect that, when one or more flexible units is/are moved across along the touch-sensitive surface, the structure will follow the movement of the one or more flexible units.

According to an embodiment of the invention, the one or more edges is/are arranged as an inner delimitation to the effect that the flexible units are restricted/prevented from a movement in direction between the positions, meaning that the flexible units squeeze against each other on the edges of the positions whereby the structure follows the movement of the flexible units across along the touch-sensitive surface.

According to an embodiment of the invention, the one or more edges is/are located as an outer delimitation to the effect that the flexible units are restricted/prevented from a movement in direction away from it/the remaining positions, meaning that the flexible units press away from each other on the edges of the positions whereby the structure follows the movement of the flexible units across along the touch-sensitive surface.

According to an embodiment of the invention, the one or more marked positions for positioning of one or more flexible units comprise(s) an edge, wherein such edge is slanting to the effect that the one or more marked positions is/are frusto-conically oriented with smallest radius facing downwards, whereby the one or more flexible units extend(s) past the top side of the structure and to the bottom side of the structure whereby a flexible unit can abut on the slanting edge and come into contact with the touch-sensitive surface through the small radius when the structure is deployed on the touch-sensitive surface.

According to an embodiment of the invention, the at least one toy building element is a toy building plate.

According to an embodiment of the invention, the at least one toy building element comprising one or more marked positions comprise(s) a flange comprising coupling means, wherein the flange is configured for coupling with a toy building plate whereby the bottom side of the at least one toy building element is in plane with the bottom side of the toy building plate whereby they combine to form the bottom side of the structure.

LIST OF FIGURES

An embodiment of the invention will now be explained in further detail with reference to the drawings, wherein.

DETAILED DESCRIPTION WITH REFERENCE TO THE FIGURES

The present invention relates to a method of providing input to an electronic unit 50 comprising a touch-sensitive surface 60 that is configured for registering application of touch by one or more flexible units 40, and a toy comprising an electronic unit 50 and a structure 1.

Touch applied to the touch-sensitive surface may be registered in different ways. The registration may be based on resistive technology that requires a lighter pressure to the surface, but the registration may also be based on capacitive technology, whereby sensing in the form of a capacitive change, either by light touch or with no direct application of touch to the capacitive screen, can be registered. The touch applied may thus be a physical contact or a capacitive contact.

Figure 1:
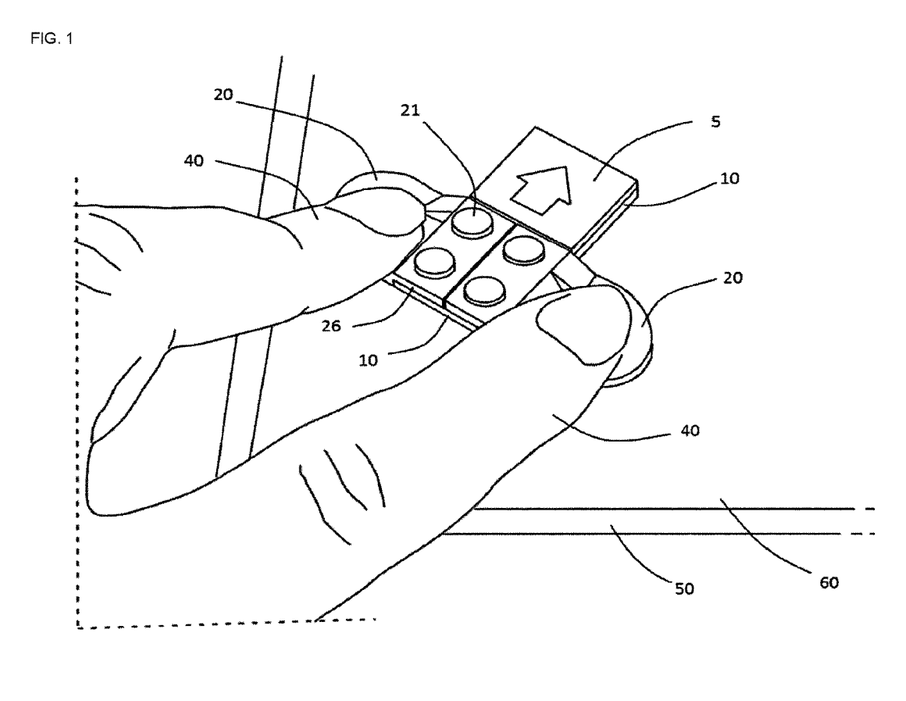
FIG. 1 illustrates a structure, in a perspective view, built from toy building elements comprising marked positions for positioning of two fingers on a touch-sensitive surface.

FIG. 1 illustrates a structure 1 built from toy building elements 5, 10, 20, and a section of an electronic unit 50 comprising a touch-sensitive surface 60.

An electronic unit 50 comprising a touch-sensitive surface 60 can be a tablet having a pressure-sensitive and/or touch-sensitive screen, wherein, by means of a finger or a pointing device, one may navigate on the unit. For instance, it may be a capacitive touch-screen that responds to a change in the capacitance of the screen surface.

The structure 1 is built from material that cannot itself be registered by the touch-sensitive surface 60. Nor does the structure 1 have any means for activation of a touch-sensitive surface 60. Rather the structure 1 comprises one or more marked positions for positioning of flexible units 40, wherein the flexible units 40 can be registered by the touch-sensitive surface 60.

In FIG. 1, the flexible units 40 are illustrated as fingers to the effect that the user's fingers can be positioned in two marked positions where the fingers extend from the top side of the structure to the bottom side of the structure, and that the fingers are thereby able to come into contact with the touch-sensitive surface 60, or that the fingers are capable of coming close to the touch-sensitive surface whereby their positions can be registered.

The electronic unit 50 is configured for being able to register the specific patterns that are formed by the flexible units 40 on the touch-sensitive surface 60.

Thereby the flexible units 40, in the shown example the user's fingers, become the connecting link between the physical world and the virtual world, the fingers' positions being defined by the physical three-dimensional structure 1, following which the electronic unit comprising the touch-sensitive surface can register the fingers' mutual positions and their movement across the touch-sensitive surface, whereby the structure 1 and the electronic unit with the touch-sensitive surface 60 are able to interact.

Figure 2:
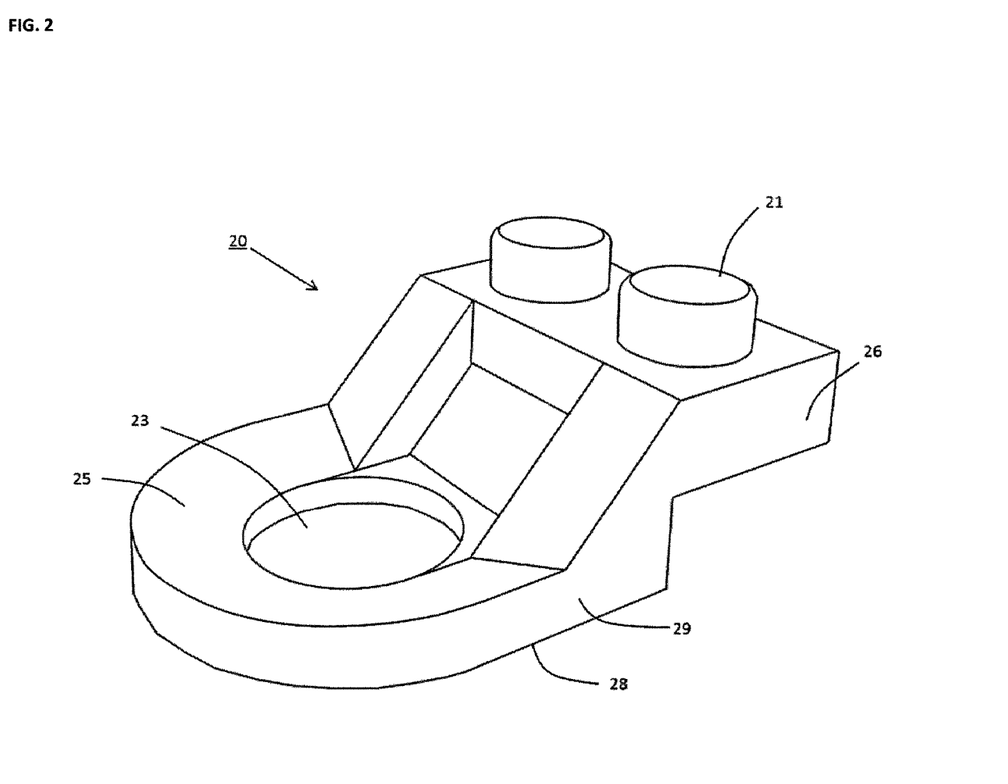
FIG. 2 illustrates a structure, in a perspective view, with a marked position configured as a through-going hole for positioning of a flexible unit.
Figure 3:
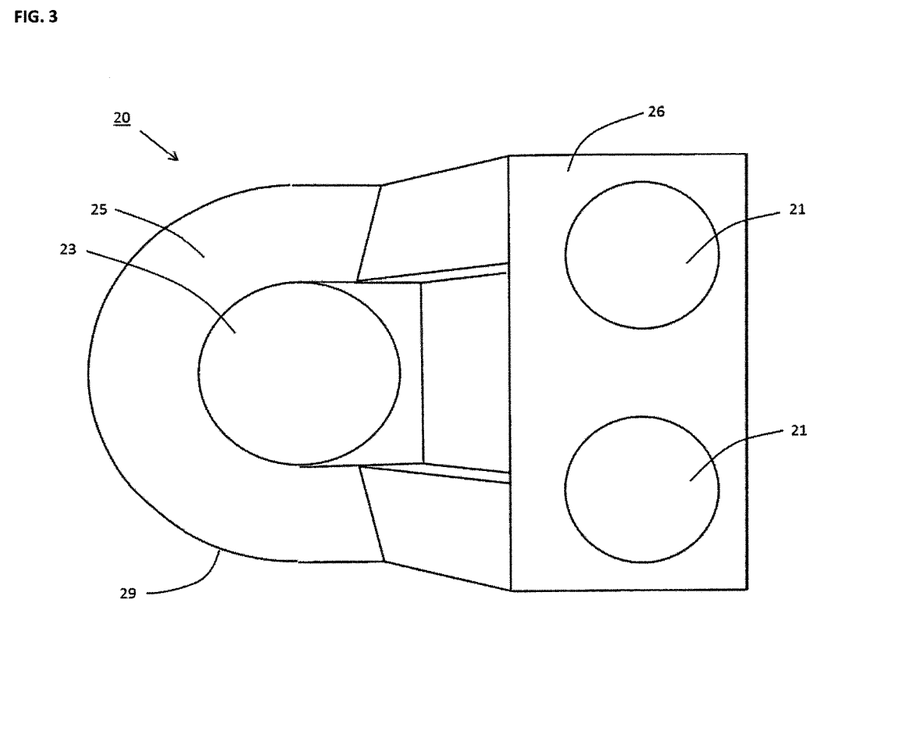
FIG. 3 illustrates a structure, seen from above, with a marked position configured as a through-going hole for positioning of a flexible unit.

The structure 1, illustrated in FIG. 1, may be constructed from toy building elements, wherein the lower part of the structure comprises a toy building element in the form of a building plate 10, two toy building elements 20 (as shown in FIGS. 2 and 3), where the two toy building elements 20 comprise marked positions 23 for positioning of two flexible units 40, illustrated as the fingers of the user.

The structure comprises a toy building element 5 that can visually illustrate the properties of the structure in the virtual world.

A marked position 23 is to be understood as a position configured for positioning of a flexible unit 40 that can be registered/recognized by an electronic unit 50 upon contact with the touch-sensitive surface 60. A marked position 23 can have many different configurations, see FIGS. 5a, 5b, and 5c; for example be in the shape of a C- or U-shaped cut-out and/or of through-going holes, either a smaller hole restricted such that only one flexible unit is able to touch the touch-sensitive surface through the hole, or a larger hole providing space enough for several flexible units to be able to come into contact with a touch-sensitive surface. A marked position is arranged on/in the structure, either at the periphery or within the periphery of the structure. A marked position in the form of a hole thus comprises both circular and oval shapes. A marked position may be marked with a particular colour, an arrow or other visual marking.

However, a capacitive sensing of a flexible unit does not require direct application of touch to the touch-sensitive surface for registering the position of the flexible unit on the touch-sensitive surface, but merely a registration of the presence of a flexible unit.

Figure 5:
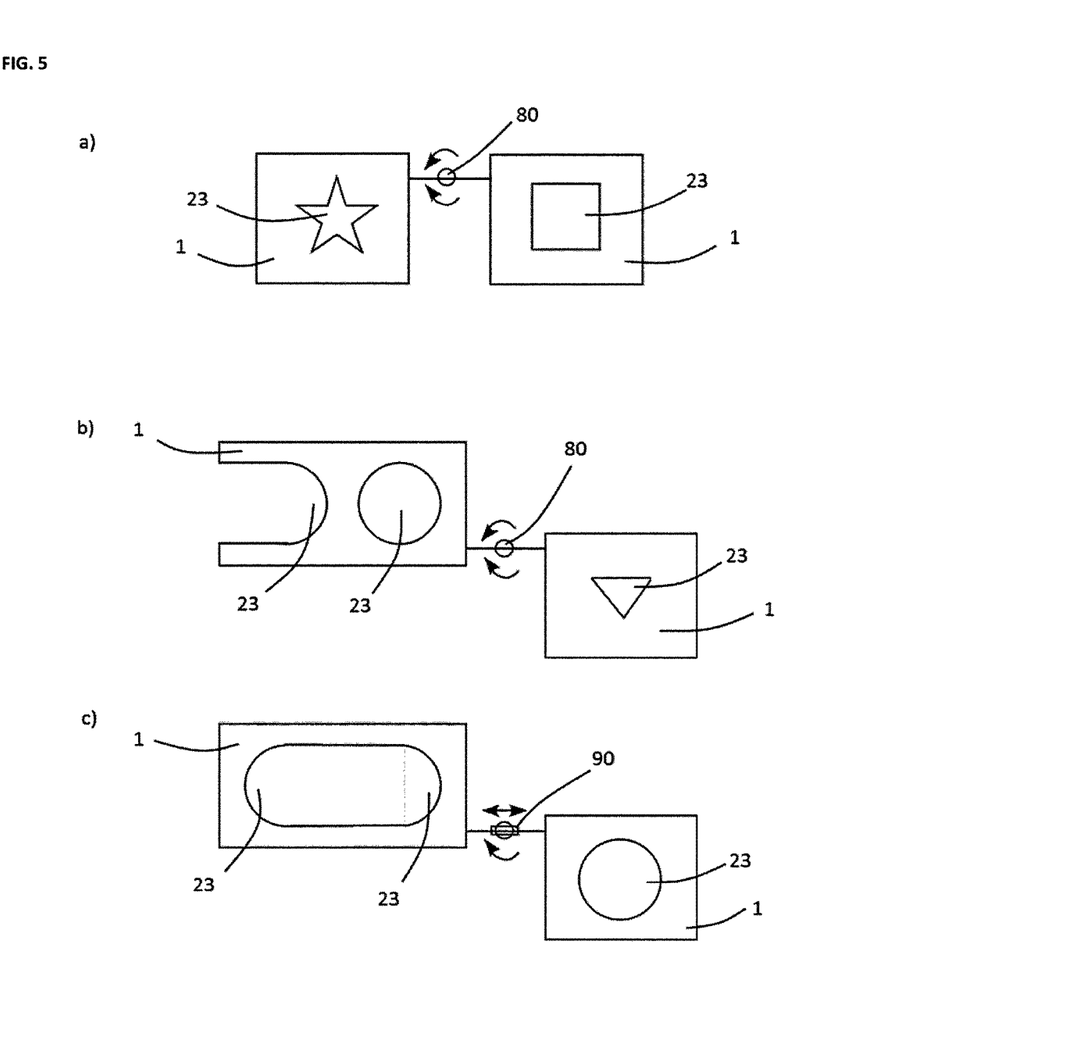
FIG. 5 illustrates structures with varying specific patterns.

FIG. 5 shows three different configurations of a structure 1, wherein the marked positions 23 combine to form variable, specific patterns.

FIG. 5a illustrates an embodiment wherein the structure 1 comprises two marked positions 23, in the form of a quadrangle and a star, respectively. Those two marked positions are connected to each other by means of a hinge 80 and combine to form a recognizable, variable, specific pattern.

FIG. 5b illustrates an embodiment in which the structure 1 comprises three marked positions 23, as a U-shaped cut-out along the periphery of the element, a circular hole and a triangular position, respectively, wherein the triangular, marked position 23 is movable relative to the two remaining, marked positions. The position of the three marked positions provides a recognizable, variable, specific pattern.

The structure illustrated in FIG. 5c further comprises a distance-adjusting element 90 to enable the one marked position 23 to be shifted relative to the two marked positions 23 configured such that they are constituted by a larger oval hole, meaning that the one marked position can be adjusted away from or closer to the two remaining marked positions in the shown embodiment.

Thus, three marked positions may be a combination of two marked positions forming a fixed, specific pattern, and wherein the third marked position is movable relative to the two others so that a structure (as illustrated in FIGS. 5b and 5c) with three marked positions can give a recognizable, but variable, specific pattern; eg FIG. 5b shows a variable pattern with two points at fixed mutual distance and a third position in a given radius compared to the pivot point of the position which, in the shown position, is not a marked position, but rather a hinge, to the effect that the pivot point sits at a fixed distance from the two mutually fixed positions. The registration of a given, specific pattern may thus be a statistic or dynamic configuration.

FIGS. 2 and 3 show a structure in the form of a toy building element 20, shown in perspective view and from above, wherein the toy building element 20 comprises a marked position 23 configured as a through-going hole for positioning of a flexible unit.

Besides, the structure comprises a top side in the form of a slanting edge 25, a bottom side 28, outer periphery 29, a flange 26, and coupling means 21 in the form of coupling studs.

The method of providing input to an electronic unit 50 thus comprising, with reference to the figures, a touch-sensitive surface 60 which is configured for registering application of touch by a flexible unit 40, comprises the following steps: to provide a structure 1 configured from a material that cannot be registered by the touch-sensitive surface 60, and which structure 1 has a top side in the form of an edge 25, and a bottom side 28 having an area that is smaller than the area of the touch-sensitive surface 60, and wherein the area of the bottom side 28 is delimited by an outer periphery 29 on the structure 1, and wherein the structure 1 comprises, either at the periphery 29 or within the periphery 29, at least one marked position 23, which position is configured with a view to the deployment of a flexible unit 40; to provide one or more flexible units 40 that comprise(s) material that can be registered by the touch-sensitive surface 60, wherein the one or more flexible units 40 extend(s) past the top side of the structure 1 and to the bottom side of the structure, to the effect that the registration of a flexible unit 40 is conditioned by the configuration of the at least one marked position 25; to deploy the structure 1 on the touch-sensitive surface 60; to deploy the one or more flexible units 40 in the at least one marked position 23 such that the touch-sensitive surface 60 is capable of registering the position of the one or more flexible units 40.

The electronic unit 50 comprises means to register the specific pattern that is formed by marked positions 23 with flexible units 40 that are in contact with the touch-sensitive surface 50.

Also, the electronic unit 50 is configured to recognize the registered, specific pattern when the one or more flexible units 40 move(s) across along the touch-sensitive surface 60 whereby the structure 1 follows the movement across along the touch-sensitive surface 60; and to recognize the registered, specific pattern; and to register the movement of the specific pattern across along the touch-sensitive surface 60.

According to an embodiment of the method, the method comprises to provide a structure 1 comprising at least two marked positions 23.

According to a further embodiment of the method, the method further comprises to provide at least two structures 1 at the same time on the touch-sensitive surface 60.

According to an embodiment of the method, the method comprises to provide one or more flexible units 40 wherein the one or more flexible units is/are constituted by one or more fingertips.

The touch-sensitive surface comprises a multi-touch-functionality whereby the surface is capable of registering plural flexible units 40 in simultaneous contact with the touch-sensitive surface 60.

FIG. 1 illustrates a structure 1 built from toy building elements, but it is possible to configure other constructions of a structure for exercising the method. For instance, a structure may also be configured from a coherent material with one or more marked positions 23, and also a toy building element may comprise at least two marked positions 23.

The toy building elements 10, 20 illustrated in FIGS. 1 and 2 comprise complementarily configured coupling means to the effect that the toy building elements can be interconnected. In the specific embodiment as shown in FIG. 1, the two types of toy building elements combine to form a plane bottom, and they combine to constitute the bottom side of the structure 1. Thus, the structure has a plane bottom side and can be deployed in a stable manner on the touch-sensitive surface.

The coupling means 21 can be configured as coupling studs and complementary coupling means.

As mentioned above, FIGS. 2 and 3 show a structure in the form of a toy building element 20. The toy building element 20 comprises a marked position 23 configured as a through-going, circular hole for positioning of a flexible unit.

Also, the toy building element 20 comprises, at the periphery of the circular, through-going hole, a top side in the form of a slanting edge 25. The slanting edge slants downwards and inwards towards the middle of the hole's centre whereby an approximately frusto-conical hole is formed with the smallest radius facing downwards towards the bottom side of the toy building element, whereby a flexible unit can abut on the top side of the structure on the slanging edges and may come into contact with the touch-sensitive surface through the small radius when the structure is deployed on a touch-sensitive surface as illustrated in FIG. 1.

A marked position 23 should be configured such that a flexible unit is retained in a specific position relative to the structure and such that the structure follows the movement of a flexible unit.

A marked position 23 for positioning of flexible units 40 comprises edges 25 such that a flexible unit 40 is prevented from moving relative to the structure 1 in a plane in parallel with the touch-sensitive surface 60 whereby, when one or more flexible units 40 is/are moved across along the touch-sensitive surface 60, the structure 1 will follow the movement of the one or more flexible units 40.

According to an embodiment, one or more edges is/are arranged as an inner delimitation to the effect that the flexible units are restricted/prevented from a movement in direction between the positions, meaning that the flexible units squeeze against each other on the edges of the marked positions whereby the structure follows the movement of the flexible units across along the touch-sensitive surface.

According to a further embodiment, the one or more edges 25 is/are located as an outer delimitation to the effect that the flexible units are restricted/prevented from a movement in direction away from it/the remaining positions, meaning that the flexible units press away from each other on the edges of the positions whereby the structure follows the movement of the flexible units 40 across along the touch-sensitive surface 60.

The registered positions of the flexible units on the touch-sensitive surface of the electronic unit combine to form a specific pattern, and that specific pattern can be registered by the software for the electronic unit 50. A specific pattern formed by the flexible units 40 can define both a fixed mutual distance between the flexible units, and any mutual angles, but optionally also a variable, specific pattern, meaning where two or more marked positions are movable relative to each other in a restricted movement.

When the flexible units 40 are registered on the touch-sensitive surface, the software for the electronic unit 50 will generate an activity and/or effect that correspond(s) to the registered pattern. When the structure 1 is moved with the fingers across the touch-sensitive surface, the movement will likewise become registered on the electronic unit 50, and the touch-sensitive surface 60 will perform an activity and/or effect corresponding to the registered pattern and the position and movements of the pattern performed by the flexible units 40.

The toy building element 20, shown in FIGS. 2 and 3, further comprises a bottom side 28, an outer periphery 29 and a flange 26 comprising coupling means.

The flange 26, in the embodiment shown in the figures, comprises coupling studs on the top side of the flange and complementary coupling means on the bottom side whereby the flange is configured for coupling with a toy building plate 10 as illustrated in FIG. 1 to the effect that the bottom side 28 of the toy building element is in plane with the bottom side of the toy building plate whereby they combine to form the bottom side of the structure. The flange 26 enables the formation of a structure having a greater plane bottom side.

According to one embodiment, the marked positions may be constituted by one or more C- or U-shaped cut-outs and/or one or more through-going holes. However, it should be possible to retain the flexible units in a concrete pattern relative to the structure, while at the same time they can be moved across the touch-sensitive surface and entrain the structure at the same time, while simultaneously maintaining the concrete pattern formed by the flexible units.

In FIGS. 2 and 3, only one marked position 23 is shown in the form of a circular, through-going hole. However, it will also be possible to configure a marked position in some other manner, eg as a larger through-going hole with room for plural flexible units, an elongate hole with two diametrically oppositely located positions which corresponds to two combined U-shaped cut-outs (see FIG. 5c). In case of a minimum of two marked positions, flexible units will still be guided in a specific position, and, due to the configuration, the marked positions will also have significance to a specific pattern registered on the touch-sensitive surface. Thus, positions define distance between the flexible units that are registered by the touch-sensitive surface.

Figure 4:
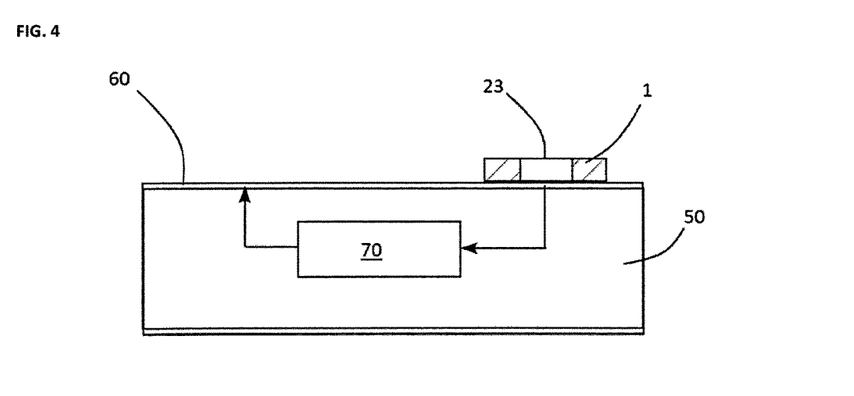
FIG. 4 illustrates an electronic unit.

FIG. 4 illustrates an electronic device 50 comprising a touch-sensitive surface 60 in the form of a screen and a processor (CPU) 70, wherein the electronic unit is configured for, via a structure 1 comprising a marked position 23, converting a specifically registered pattern created by the structure to an image on the touch-sensitive surface whereby the physical structure with marked positions is registered on the touch-sensitive, interactive surface and, via the software in the electronic unit, can then execute the programmed effects by the presence of the physical structure, to the effect that each specific pattern provides input and subsequent specific effect on the screen.

The invention claimed is:

1. A toy comprising:
an electronic unit comprising a touch-sensitive surface having an area; and
a structure made of a material that cannot be registered by the touch-sensitive surface, the structure having a top side and a bottom side, the bottom side having an area that is smaller than the area of the touch-sensitive surface, where the bottom side is delimited by an outer periphery on the structure, and where the structure comprises two or more marked positions, each marked position of the two or more marked positions being provided at or within the outer periphery and configured for receiving and positioning of a flexible unit;
wherein the structure can be deployed at any position on the touch-sensitive surface and is configured to be slideable relative to said touch-sensitive surface; and
wherein the electronic unit is configured to:
register positions of two or more flexible units received and positioned by the structure on the touch-sensitive surface;
register movement of a specific pattern that is formed by the two or more flexible units that are kept in a fixed interrelationship by being deployed in the two or more marked positions of the structure;
recognize the specific pattern; and
convert the specific pattern to an image on the touch-sensitive surface, the touch-sensitive surface comprising a screen.

2. The toy according to claim 1, wherein the structure consists of a toy building set comprising at least two toy building blocks, wherein each toy building block of the at least two toy building blocks is provided with one or more complementarily configured coupling means to an effect that the at least two toy building blocks can be interconnected to form said structure; and wherein at least one of the at least two toy building blocks comprises the two or more marked positions for positioning of the two or more flexible units.

3. The toy according to claim 2, wherein each toy building block of the at least two toy building blocks comprises at least two different types of coupling means, such as couplings studs and complementary coupling means.

4. The toy according to claim 2, wherein the at least two toy building blocks are toy building plates.

5. The toy according to claim 4, wherein each toy building block of the at least two toy building blocks comprise a flange comprising coupling means, wherein the flange is configured for coupling with a toy building plate whereby a bottom side of at least one toy building element is in plane with a bottom side of the toy building plate whereby they combine to form the bottom side of the structure.

6. The toy according to claim 2, wherein the at least two toy building blocks are hinged.

7. The toy according to claim 1, wherein the two or more marked positions are constituted by one or more C- or U-shaped cut-outs and/or one or more through-going holes.

8. The toy according to claim 7, wherein each marked position of the two or more marked positions for positioning of the two or more flexible units comprises one or more edges, whereby the two or more flexible units, when positioned in the two or more marked positions, are prevented from moving relative to the structure in a plane in parallel with the touch-sensitive surface to an effect that the structure will follow movement of the two or more flexible units.

9. The toy according to claim 8, wherein the one or more edges are arranged as an inner delimitation, thereby restricting movement of the two or more flexible units in direction between the two or more marked positions, whereby the structure follows the movement of the two or more flexible units relative to the touch-sensitive surface.

10. The toy according to claim 8, wherein the one or more edges are located as an outer delimitation, thereby restricting movement of the two or more flexible units in direction away from remaining positions, whereby the structure follows the movement of the two or more flexible units relative to the touch-sensitive surface.

11. The toy according to claim 8, wherein each marked position of the two or more marked positions for positioning of the two or more flexible units comprises a surface, wherein the surface of each marked position is slanting to an effect that the two or more marked positions are frusto-conically oriented with smallest radius facing downwards, whereby the slanting surfaces can abut the two or more flexible units.

12. The toy according to claim 1, wherein the two or more flexible units are kept in a fixed relationship relative to the touch-sensitive surface.

* * * * *